United States Patent [19]

Hebert et al.

[11] Patent Number: 4,535,750

[45] Date of Patent: Aug. 20, 1985

[54] BROILER OVEN

[75] Inventors: Philip J. Hebert, Barrie; Leon G. Blanchette, Mississauga, both of Canada

[73] Assignee: LeBlanco Limited, Oakville, Canada

[21] Appl. No.: 531,481

[22] Filed: Sep. 9, 1983

[30] Foreign Application Priority Data

Sep. 1, 1983 [CA] Canada ................................. 435909

[51] Int. Cl.³ ........................ A47J 37/00; A47J 37/04
[52] U.S. Cl. ................................ 126/41 B; 126/19 R
[58] Field of Search ................. 126/19 R, 41 A, 41 B, 126/41 R, 41 C; 99/421 P, 421 R, 420

[56] References Cited

U.S. PATENT DOCUMENTS

| 644,747 | 3/1900 | Shumaker | 126/41 C |
| 1,638,452 | 8/1927 | Panajiotaros et al. | 126/41 B |
| 1,949,361 | 2/1934 | Starr | 126/41 C X |
| 2,927,479 | 3/1960 | Pritz | 99/421 P X |
| 3,706,272 | 12/1972 | Wilson | 99/421 P |
| 4,214,516 | 7/1980 | Friedl et al. | 99/421 P |

FOREIGN PATENT DOCUMENTS

| 555893 | 1/1957 | Italy | 99/421 P |
| 880899 | 10/1961 | United Kingdom | 99/421 P |

Primary Examiner—Larry Jones
Attorney, Agent, or Firm—Berman, Aisenberg & Platt

[57] ABSTRACT

There is provided a new and useful broiler oven comprising an elongated cooking compartment, first and second rotisserie drive drums, and a dual drive unit, the cooking compartment defined by bottom and rear walls, a front wall including a door, and first and second end walls each including a large circular opening therethrough, and including at least one heating unit in an upper part of the compartment, the compartment substantially unobstructed below the heating unit; the first and second rotisserie drive drums each having a front face of diameter just less than the circular openings and being mounted for rotation on respective first and second coaxial shafts in respective ones of the circular openings, each drum having a series of spit sockets extending into and mounted for rotation in the front face thereof, the sockets being equispaced around a circular axis on the drums, and individual ones of the sockets in the first drum being axially aligned with corresponding ones in the second drum, the sockets in the first drum being driven in rotation by a set of planetary gears driven by a sun gear; and wherein the dual drive unit is located outside the cooking compartment and operatively connected to drive the first and second shafts.

12 Claims, 9 Drawing Figures

BROILER OVEN

BACKGROUND OF THE INVENTION

There has been a great deal of discussion in recent years and there is an increasing body of statistics concerned with the dramatic shifts in eating habits which are currently taking place in the population as a whole. More and more meals are being eaten out of the home, and more and more pre-cooked meals are being purchased for eating at home. These developments are having an important impact on the food service industry. Higher quality foods are being demanded and competition requires that reasonable costs be maintained.

In order to ensure quality products, increasing demands have been placed on equipment suppliers to provide appliances that will provide reasonably fast, even and complete cooking. Similarly, the equipment must bear a heavy work load and must be capable of a long useful life. The equipment must be relatively maintenance free and, when necessary, routine maintenance must be capable of performance without undue waste of time.

Coincident with the movement toward eating outside the home, health protection authorities have become vigilant to ensure cleanliness and the like healthy environments in commercial kitchens. This factor has also effected the design and maintenance of kitchen appliances, specifically to enable easier and more thorough cleaning. Thorough cleaning not only contributes to health protection, but, in the case of grease and the like, reduces fire hazards.

A further factor of importance is that equipment be designed to provide an attractive and safe work area for kitchen workers and must, as well, when exposed to view, create a favourable impression on the consumer.

With reference to broiler ovens, these appliances are very high profile pieces of equipment. They are frequently located in full view of the consumer and are so placed to take full advantage of the promotional effect of the appearance and aroma of the cooking products. For this reason it is especially important that this equipment be clean and attractive, and quiet and smooth in operation at all times.

The present invention provides an oven that deals with the problems discussed above. The oven deals with problems of cleanliness, long and maintenance free useful life, and generally improved efficiency.

PRIOR ART

There are in the prior art a substantial number of broiler ovens in the basic format of a cooking compartment including a heating element of some sort and a rotisserie arrangement, generally employing a planetary gear system, capable of rotating a series of food bearing spits before the heating element.

For example, U.S. Pat. No. 2,762,293 represents an earlier oven which, while intended to be rotated by hand, includes an advanced planetary gear system for individual spit rotation.

The most recent prior art of which applicant is aware is Canadian Patent No. 1,104,017, issued July 29, 1980 to Freidl et al. The "Barbecue Oven" disclosed and claimed in that patent combines various features well known in the broiler oven art to produce the claimed combination. The oven suffers from a number of the defects noted above, particularly, although not exhaustively, including cleaning problems, and maintenance and life expectancy problems resulting in part from the location of much of the drive mechanism within the cooking compartment.

This patent also shares with the prior art in general mechanical shortcomings arising out of the effect on the drive mechanism of the substantial torque created by the loaded spits.

The broiler oven of the present invention is directed, inter alia, to these specific problems.

SUMMARY OF THE INVENTION

The problems discussed above are addressed in the present invention by a new combination of elements combining a number of elements common in the art with innovative subject matter. The combination includes a dual drive mechanism which greatly reduces torque related mechanical problems. Further the oven is so constructed that substantially the entirety of the interior of the cooking compartment is unobstructed and so readily susceptible of thorough cleaning. In addition, with the exception of the faces of the spit drive drums, all of the mechanicals are outside of the cooking compartment.

Thus, the invention provides a broiler oven comprising an elongated cooking compartment, first and second rotisserie drive drums, and a dual drive unit; the cooking compartment defined by top, bottom, and rear walls, a front wall including a door, and first and second end walls each including a large circular opening therethrough, and including at least one heating unit in an upper part of the compartment, the compartment substantially unobstructed below the heating unit, the first and second rotisserie drive drums each having a front face of diameter just less than the circular openings and being mounted for rotation on respective first and second coaxial shafts in respective ones of the circular openings, each drum having a series of spit sockets extending into and mounted for rotation in the front faces of the drums, the sockets being equispaced around a circular axis on the drums, and individual ones of the sockets in the first drum being axially aligned with corresponding ones in the second drum, the sockets in the first drum being driven in rotation by a set of planetary gears driven by a sun gear; and wherein the dual drive unit is located outside the cooking compartment and operatively connected to drive the first and second shafts.

GENERAL DESCRIPTION

The broiler oven of the present invention reduces or eliminates a number of the problems discussed above. It has generally been the case that earlier ovens of this general type have included a central drive shaft driven at one end only. The spit support unit at the opposite end of the central shaft is not driven in these units but simply rotated with the shaft. When a series of spits is fully loaded and being rotated in such a unit, very serious torque problems can result. Strain is put on the drive motor and on the bushings. The result is an increase in maintenance problems and a shortening of the life expectancy of the unit.

The dual drive system in the present case substantially reduces torque problems. The spit support mechanisms at both ends of the oven are positively driven, preferably off of a single drive shaft, so that the twisting tendency and the excess stress on one end of the unit is reduced or eliminated. The result is that the unit operates very smoothly and is capable of long and trouble free operation.

The problem of adequate cleaning is also addressed by the present invention. It must be accepted that staff responsible for cleaning in commercial kitchens are frequently and understandably poorly motivated in respect of cleaning duties. It is therefore of very considerable importance, in view of increasingly stringent health regulations, that broiler ovens be capable of fast and thorough cleaning with a minimum of obstacles. To date broiler ovens have generally included within the cooking compartment the bulk of the drive mechanism, including the spit support units and a central drive shaft. These compartments not only represent grease and residue catchers which are difficult in themselves to clean thoroughly, but also comprise obstacles to cleaning of the interior of the oven generally. It is frequently the case that these ovens include only a single door, in the front, or are placed against a wall, in which case it is very difficult to clean the back parts of the oven and the rearwardly facing sides of bearings or other non-rotating surfaces.

The oven of the present invention provides a cooking compartment interior that is substantially unobstructed. The unit has no central shaft. The spit drive and support units are almost completely removed from the cooking compartment. Only the front faces of these units are presented to the interior of the compartment, and in the preferred embodiment these front faces are flush with the end walls of the oven. There is thus presented for cleaning substantially an open box with generally smooth sides.

The removal of all of the drive and support mechanisms from the cooking compartment has the additional significant advantage that these components are protected from the direct heat of the broiling unit and from most leakage of grease and residue into the mechanisms. In the present invention only the faces of the spit drive and support units, and the spit sockets, are exposed to these effects. In the preferred case the outer side of the spit drive drums is insulated to further reduce heat effects outside of the cooking compartment.

Thus the present invention can be seen to present significant advantages in a number of areas over prior art such devices. Further features and advantages are discussed in the detailed description of the preferred embodiments.

BRIEF DESCRIPTION OF THE DRAWINGS

In drawings which illustrate embodiments of the invention.

While the invention will be described in conjunction with these preferred embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 1:
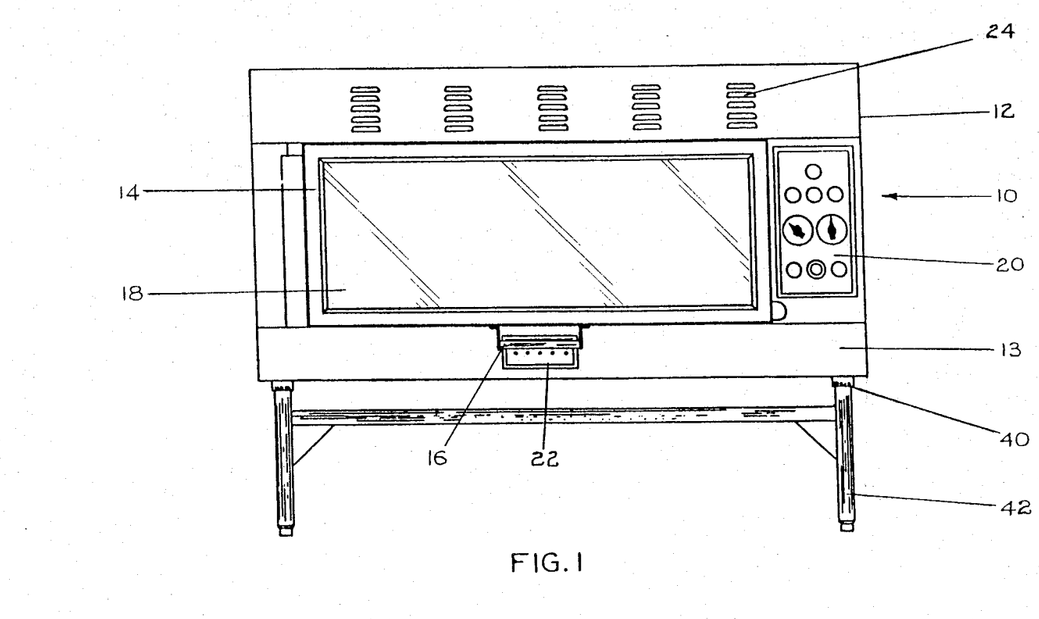
FIG. 1 is a front elevation of an oven according to the invention.
Figure 2:
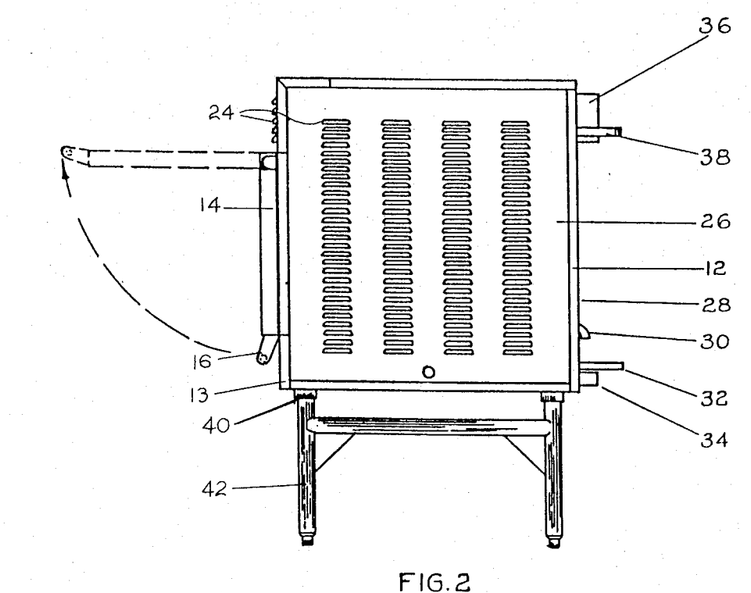
FIG. 2 is an end elevation of the oven of FIG. 1.

With reference to the drawings, there is illustrated a broiler oven 10 having exterior casing 12 and, on the front side 13 thereof, a door 14 including a handle 16 and window 18, control panel 20, lubrication panel 22 and vents 24. Vents 24 are also provided on the ends 26. The rear wall 28 includes connections for electrical inlet 30, water inlet 32 and drain 34, exhaust vent 36, and, where appropriate, fuel inlet 38. The oven includes legs 40 and, as illustrated, is mounted on a support frame 42.

Figure 3:
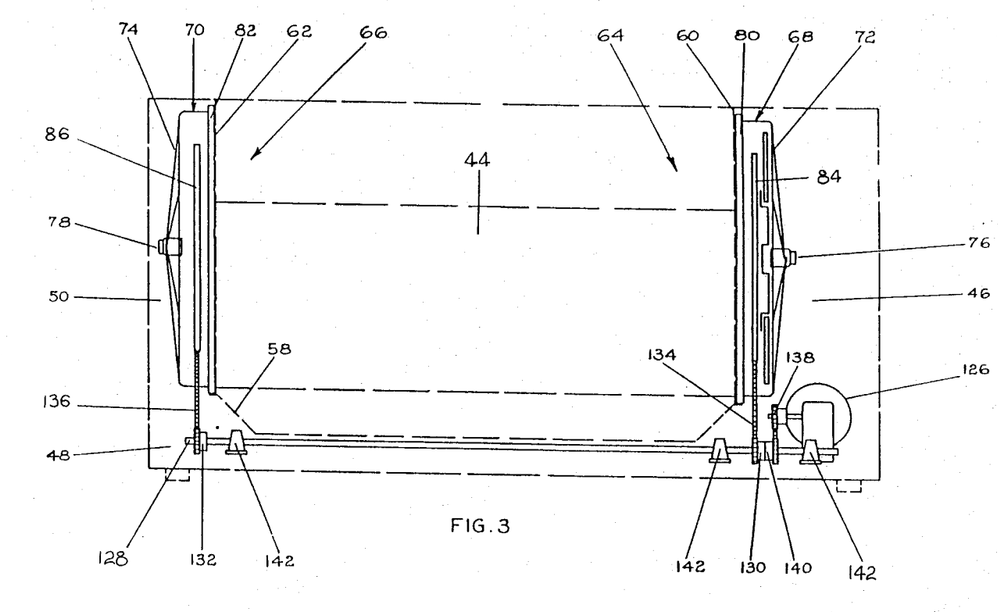
FIG. 3 is a front elevation partly in section of an oven according to the invention.
Figure 4:
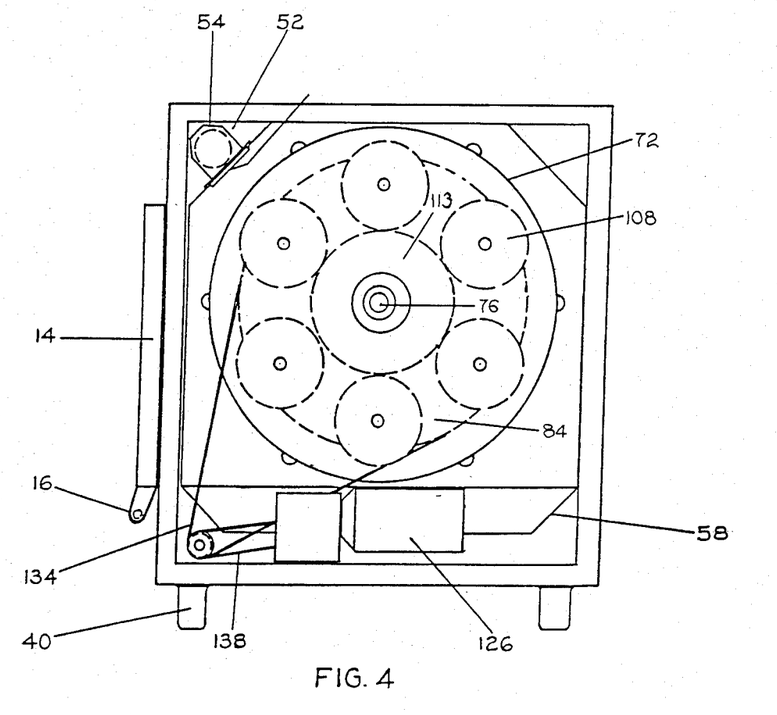
FIG. 4 is an end elevation partly in section of the embodiment of FIG. 1.

The interior of the oven 10 is divided into a number of interconnecting compartments. These comprise the cooking compartment 44 and drive compartments 46, 48 and 50.

The cooking compartment 44 includes a conventional broiler cooking element 52 which may vary depending on the energy source. Thus, while an electric element may be used, it is preferable that the unit comprise a gaseous fuel burner 54 behind a ceramic tile radiating surface 56. The preferred fuel is propane or natural gas. As illustrated, the cooking element is preferably conventionally located in the upper part of cooking compartment 44 to avoid problems of dripping grease and residue. For purposes of evenness of cooking, exposure of cooking product to the area near the element, and like considerations, the element is preferably placed in an upper corner of the compartment 44 and appropriately angled toward the cooking product. The element is preferably at the upper front corner so that it is directed away from the door.

The cooking compartment 44 also includes a conventional drip tray 58 in the bottom thereof. The tray preferably covers the whole of the area of the bottom of compartment 44 and may be integral with the bottom.

In operation the drip tray will contain a quantity of water both to diffuse the grease and residue dripping from the cooking product and to provide moisture which enhances the cooked product. In the preferred case the oven is provided with a fresh water connection 32 and a drain 34 to deal with the water requirements. Control valves may be provided as necessary and are preferably operable from the control panel 20.

At each of ends 60 and 62 of the compartment 44 there are provided axially aligned large circular openings 64 and 66 respectively, joining that compartment to drive compartments 46 and 50 respectively.

Compartments 46 and 50 contain drive drums 68 and 70 respectively. Drive drums 68 and 70 include housings 72 and 74 respectively in which shafts 76 and 78 are mounted for rotation. Shafts 76 and 78 carry for rotation therewith the spit support discs 80 and 82 and the drive gears 84 and 86. Drive gears 84 and 86 are preferably sprocket wheels.

Figure 5:
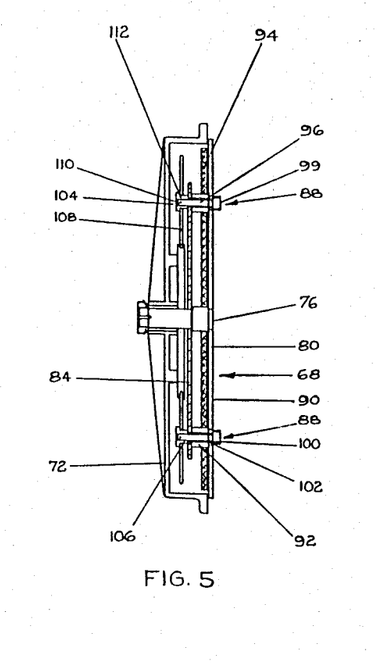
FIG. 5 is a side elevation in section of a spit drive drum as illustrated at the right hand side of FIG. 3.

The drive drum 68 includes a series of spit support mechanisms 88 opening into the face 90 of the disc 80. The mechanisms 88 are equidistant from the shaft 76 and equispaced around the disc 80.

Figures 6, 9:
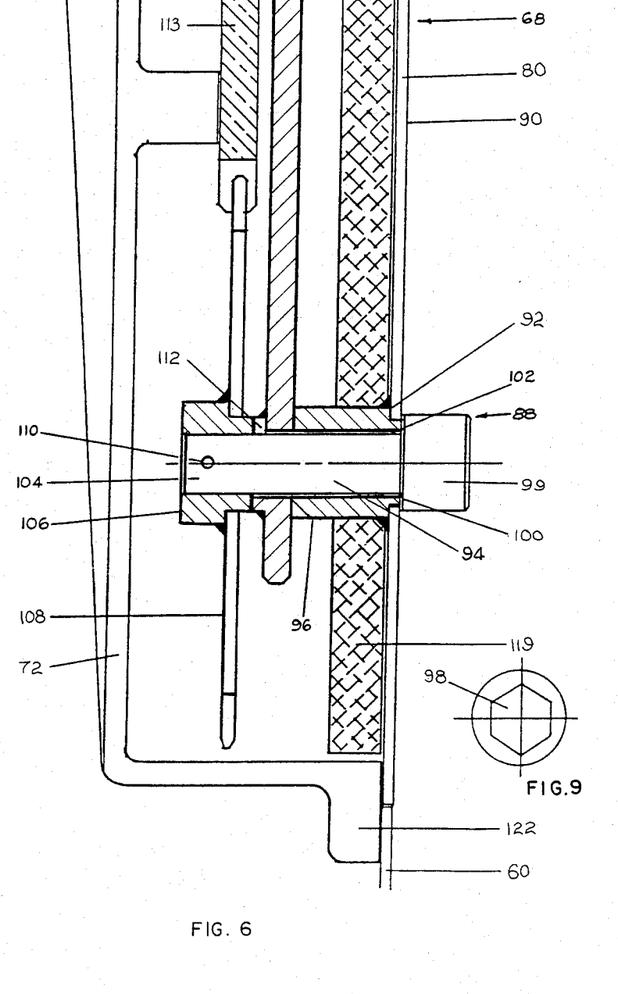
FIG. 6 is an enlarged partial side elevation of the embodiment of FIG. 5.
FIG. 9 is an end elevation of a spit drive socket from the drum of FIG. 5. Note that FIG. 9 appears on a sheet with FIG. 6.

Each mechanism 88 includes a sleeve 92 extending through the disc 80 and secured to the disc 80 and the sprocket wheel 84. A shaft 94 is mounted for rotation on bearing 96 in the sleeve 92 and through sprocket wheel 84. The shaft is provided at its outer end with a socket 98 adapted to receive a spit. The socket is required to transmit rotational movement to the said spit and thus preferably will have an appropriate cross-section such as hexagonal.

As illustrated, the socket 98 is located in a shaft section 99 of enlarged diameter, the shoulder 100 of which abuts against a sealing washer 102 on the face 90 of the disc 80.

The opposite end 104 of shaft 94 extends beyond the sprocket wheel 84. The planetary gear 108 is secured toward the end 104 of the shaft 94 by any suitable means, preferably the flanged sleeve 106 and the roll pin 110. The washers 112 bear against the sprocket wheel 84 and the end of the sleeve 92 and with the washer 102 maintain the axial positioning of the shaft 94.

The sun gear 113 is fixed to the housing 72 in operative alignment and positioning with the planetary gears 108. The arrangement is clearly illustrated in FIGS. 5 and 6. The fixed sun gear causes rotation of the planetary gears 108 when the shafts 94 rotate with the drive gear 84 and spit support disc 80 about shaft 76. The sockets 98 thus rotate on their own axes while also rotating about the axis of disc 80.

Any other suitable arrangement would be acceptable to provide the basic planetary gear system or otherwise to provide the two axes of rotation for the spit sockets 98. The arrangement just described, however, has been found preferable.

Figure 7:
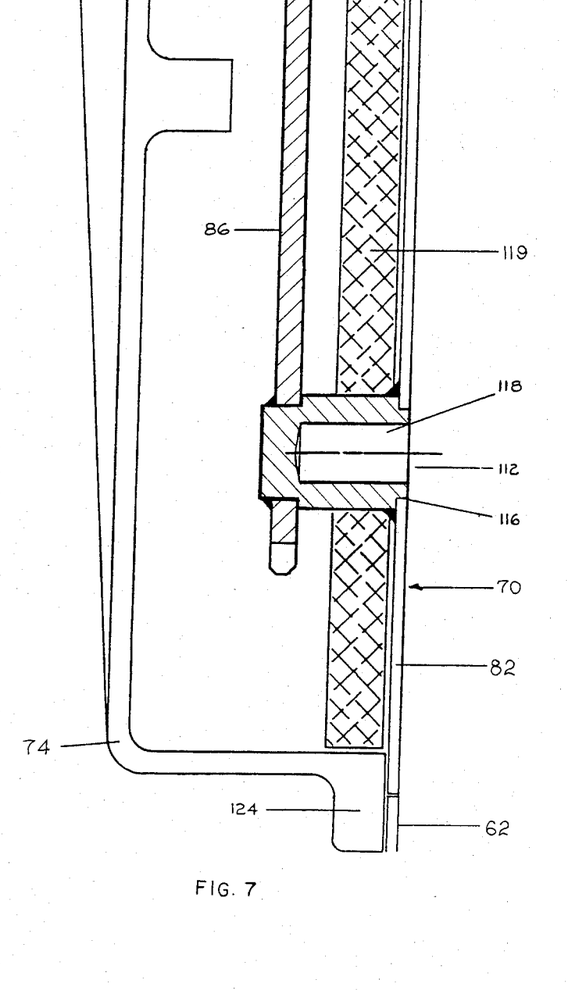
FIG. 7 is a partially sectioned side elevation of a spit drive drum as illustrated at the left hand side of FIG. 3.
Figure 8:
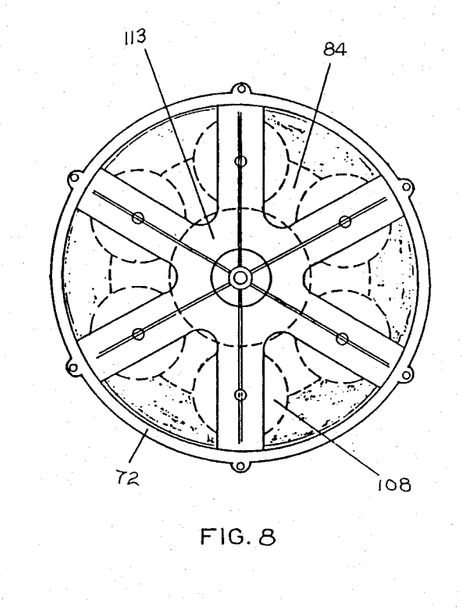
FIG. 8 is an end elevation in section of the drive drum of FIG. 5. Note that FIG. 8 appears on a sheet with FIG. 5.

Turning again to the drive drum 70, the mechanisms within that drum may be identical to those of drum 68. In the preferred case, however, it has been found unnecessary to include in drum 70 a planetary gear system. Rather, as described below, it is generally adequate that the spit support mechanisms 114 at this end of the oven simply provide vertical support for the spits which will allow the rotation imparted by the planetary gears at the other end.

Thus, the sleeve 116 extending between and secured to the support disc 82 and the drive gear 86 simply provides a cylindrical cavity 118 to accommodate the end of a spit. Clearly the cavities 118 are axially aligned with corresponding sockets 98 in disc 80. Shoulders, grooves or the like may be provided in sleeve 116 as required to interact with a spit to limit the axial movement of the spit to ensure proper positioning of the drive end of the spit in socket 98.

Both of drums 68 and 70 are preferably provided with insulation 119 backing discs 80 and 82 to reduce the heat transfer to the drive mechanisms and the control components.

The housings 72 and 74 secure the shafts 76 and 78 centrally and in axial alignment in the openings 64 and 66. The dimensions and positioning are preferably chosen such that the faces 90 and 120 of the support discs 80 and 82 are substantially flush with the inner surfaces of end walls 60 and 62. The discs 80 and 82 are of diameter just less than openings 64 and 66 to allow free rotation.

The housings 72 and 74 include peripheral flanges 122 and 124 which are in sliding sealing contact with the discs 80 and 82 and in sealing contact with the outer surface of end walls 60 and 62 around the periphery of openings 64 and 66. A sealing device such as an O-ring may be interposed between the discs and the flanges.

The primary driving mechanisms for the drive drums is preferably an electric motor 126 which powers a drive shaft 128 in the drive compartment 48. The compartment 48 extends across the oven interconnecting compartment 46 and 50.

Two gears 130 and 132, preferably sprocket wheels, are secured to the shaft 128 in operative alignment with the drive gears 84 and 86. The drive chains 134 and 136 transmit power from gears 130 and 132 to rotate drive gears 84 and 86.

In the preferred case the motor 126 is located in compartment 46 or 50 transmits power to the shaft 128 through the chain 138 and sprocket 140.

The shaft 128 is preferably supported in a set of pillow blocks 142.

In the conventional manner the oven will be supplied with a thermostatic heat control and an automatic timer. In addition, the unit will preferably have an interlocking control system that will provide safety and energy conservation features. Thus, when in normal operation in the cooking mode, the opening of the door will cause power to be cut to the motor and the cooking element to be turned off. Reclosing the door will result in reactivation. A jog switch is provided to briefly activate the motor to rotate the drive drums to facilitate loading and unloading of the oven.

It can be seen from the above description that there has been provided a greatly improved broiler oven offering significant advantages over the prior art. In particular, the substantially unobstructed interior of the oven offers greatly improved cleanability, contributing to health considerations, life expectancy of the machine and to reduction of fire hazards. The removal of all of the drive mechanism from the cooking compartment also reduces the deleterious effects of heat on those mechanisms. In addition, the dual drive system contributes to the smoother operation and increased life expectancy of the machine.

The broiler oven fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A broiler oven comprising an elongated cooking compartment, first and second rotisserie drive drums, and a dual drive unit;

said cooking compartment defined by top, bottom, front and rear walls, at least one of which includes a door, and first and second end walls each including a large circular opening therethrough; said compartment including at least one heating unit in an upper part thereof and being substantially unobstructed below said heating unit;

said first and second rotisserie drive drums each having a spit support disc of diameter just less than said circular openings and being mounted for rotation on respective first and second axially aligned shafts centrally mounted in respective ones of said circular openings, said shafts not penetrating substantially into said compartment; each said drum having a series of spit sockets extending through and mounted for rotation in the said discs, said sockets being equispaced around a circular axis on said discs, and individual ones of said sockets in said first disc being axially aligned with corresponding ones of said second disc; the sockets in said first disc being driven in rotation by a set of planetary gears;

and wherein said dual drive unit is located outside said cooking compartment and is operatively connected to drive said first and second shafts.

2. The oven of claim 1 wherein the said discs include front faces which are substantially flush with the said end walls of the cooking compartment.

3. The oven of claim 2 wherein each said drive drum includes a housing having a circumferential flange secured to said end walls and also includes a bearing surface for said discs.

4. The oven of claim 1 in which said first and second drive drums and said dual drive unit are enclosed in compartments.

5. The oven of claim 1 wherein said heating unit comprises at least one electric element.

6. The oven of claim 1 wherein said heating unit is a gaseous or liquid fuel burner and is located in a compartment having a ceramic heat radiating surface.

7. The oven of claim 1 wherein the said dual drive unit comprises an elongated drive shaft outside said cooking compartment, driven by a motor and extending parallel to and offset from said first and second shafts to a position adjacent each said drive drum, and operatively connected to each said drum.

8. The oven of claim 7 wherein the dual drive unit includes two drive sprockets on said drive shaft, and wherein each of said first and second shafts includes a drum drive sprocket aligned with and connected by a drive chain to a respective one of said two drive sprockets.

9. The oven of claim 1 including a housing for said drive drum and a sun gear in said planetary gears, and wherein the said sun gear is fixed to the said housing.

10. The oven of claim 7 wherein said dual drive shaft is driven by an electric motor.

11. The oven of claim 1 wherein the said door is hinged to open upwardly of said oven.

12. The oven of claim 1 wherein the said discs include rear faces which are insulated from said cooking compartment.

* * * * *